UNITED STATES PATENT OFFICE.

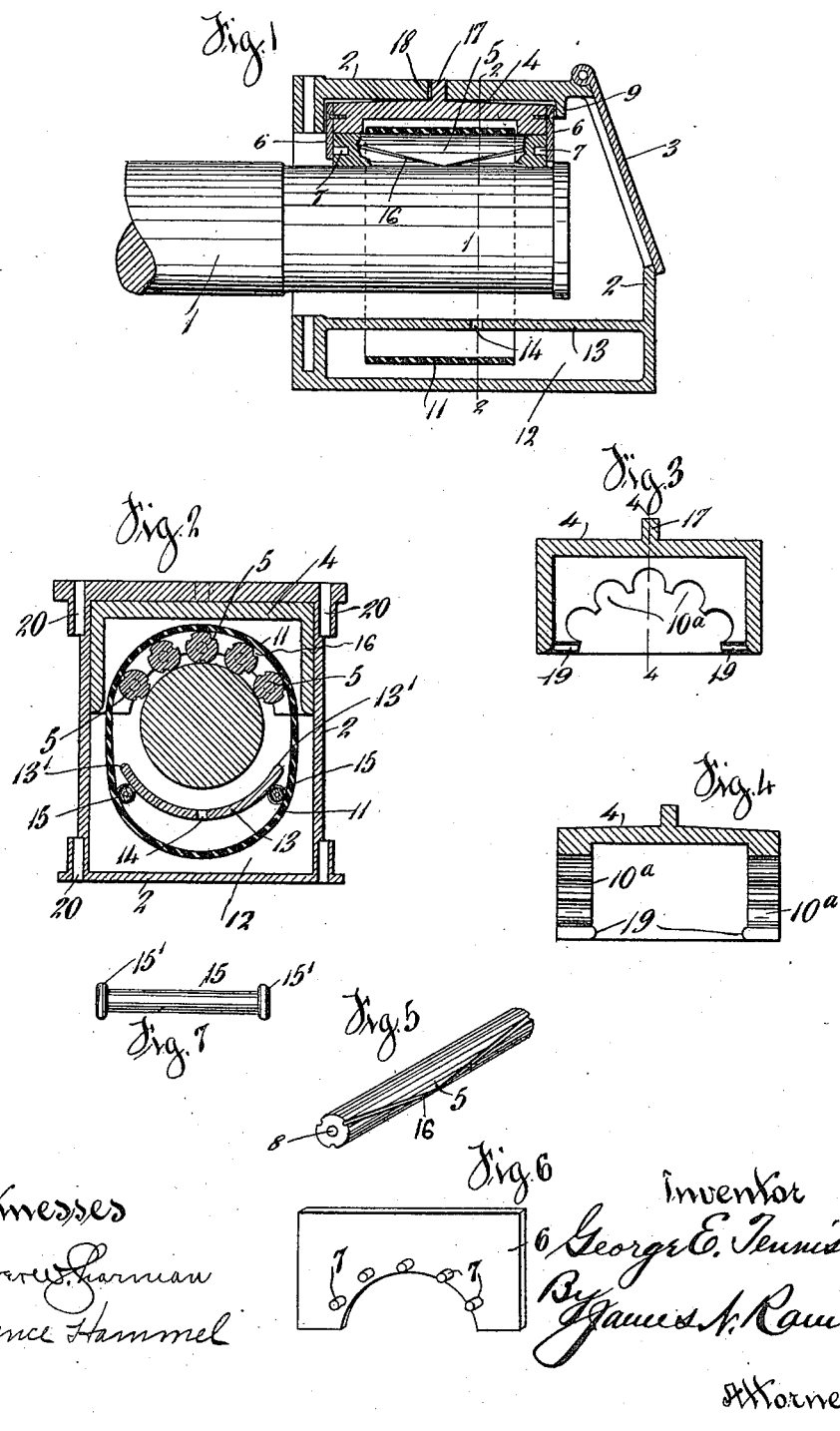

GEORGE E. TENNISON, OF CINCINNATI, OHIO.

SELF-LUBRICATING CAR-AXLE BEARING-BOX.

976,314.   Specification of Letters Patent.   Patented Nov. 22, 1910.

Application filed December 30, 1909.  Serial No. 535,670.

*To all whom it may concern:*

Be it known that I, GEORGE E. TENNISON, a citizen of the United States, residing at Cincinnati, in the county of Hamilton and State of Ohio, have invented certain new and useful Improvements in Self-Lubricating Car-Axle Bearing-Boxes, of which the following is a specification.

My invention relates to improvements in self-lubricating car axle bearing boxes.

The object of my invention is to provide a simple, durable, efficient and inexpensive self-lubricating bearing box for car axles in which the friction is reduced to a minimum.

My invention consists in a car axle box having a journal therein and a self-oiling conveyer which is mounted on bearing rollers placed in said box and which extends therefrom into an oil well, said bearing rollers having diverging channels therein, whereby the oil or lubricant lifted onto said bearing rollers may be uniformly distributed over the entire surface of the axle.

In carrying out my invention I dispense with the iron shoe and brass and cotton waste commonly used in the journal boxes and I provide a metal journal box having bearing rollers therein, preferably of steel, there being a space between the bearing rollers and in the central part of the journal box through which an endless belt or chain travels over the bearing rollers and furnishes a constant supply of oil to the axle, an oil well being provided at the bottom and having means for maintaining the belt in its proper position and preventing splashing of the oil.

My invention further consists in certain novel parts and combination of parts as will hereinafter be described and claimed.

In the drawing which serves to illustrate a preferred construction of my invention: Figure 1 is a vertical section through my improved bearing box taken centrally of Fig. 2. Fig. 2 is a cross section taken on the line 2—2 of Fig. 1. Fig. 3 is a detail sectional view of the yoke for the bearing rollers. Fig. 4 is a cross section taken on the line 4—4 of Fig. 3. Fig. 5 is a detail perspective view of one of the bearing rollers. Fig. 6 is a detail view of a plate having pins to fit in the ends of the bearing rollers. Fig. 7 is a side view of the preferred construction of the guide rollers to hold the endless belt out of contact with the partition.

In the construction as illustrated, 1 represents the common form of car axle or shaft, and 2 represents my new improved bearing box having a lid 3.

Placed directly above the shaft 1 is a journal piece or yoke 4 which is adapted to carry grooved bearing rollers 5, said yoke being best illustrated in Figs. 3 and 4. Mounted on the ends of said yoke is a plate 6 having pins 7 mounted thereon, as best shown in Fig. 6. This plate 6 is adapted to be fastened to the ends of the yoke 4, shown in position in Fig. 1, said pins 7 being adapted to engage sockets 8 in the ends of the bearing rollers 5, which are mounted thereon. Placed on the inside of the upper frame of the car box is a rib 9 which is cast on the frame of the car box for the purpose of holding the yoke 4 in position.

I preferably construct the yoke 4 with a lug 17 projecting through an opening 18 in the top of the box to hold it in proper relative position therein, and I also taper the top of the yoke toward each end from said lug, as shown in Figs. 1 and 4, in order to provide sufficient play between the yoke and the box to overcome irregularities or variation in the track which would otherwise raise one side of the car above the other and prevent an even bearing between the axle and the bearing rollers in the yoke, which I insure by means of said tapered top. I also provide guards 19 on the inner lower part of the yoke to hold the endless belt or chain 11 in central position in the open space between its ends and to prevent engagement with said ends. The axle box is provided with suitable bolt holes 20 by which the box may be connected to the car.

The yoke 4 has an open space between its ends, and is provided with recesses 10ª in its ends to allow the bearing rollers to be mounted therein. The endless belt or chain 11 passes over said bearing rollers upon which it is mounted through the open space provided in the yoke 4, and extends into the oil well 12 in the lower part of the axle box. A partition 13 is provided in the axle box below the shaft for the purpose of maintaining the belt in its proper position and preventing splashing of the oil. The partition 13 is also provided with a drain opening 14. Rollers 15 are mounted upon the partition 13 to engage the belt 11 in order that said belt 11 will not come in contact with the edges 13' of the partition 13, and these rollers are preferably provided with flanges 15' to hold the belt in proper position. Thus, it is seen that the endless belt or chain furnishes a constant supply of oil to the axle, the diverging grooves 16 in the bearing rollers 5 helping to distribute the oil throughout their length and to the bearing surface of the shaft 1. Thus it is apparent that I obtain many advantages from my construction of a bearing box which are not possible with the common form of bearing box now in use.

With my new improved bearing box, a hot box is completely avoided, a great saving of oil is accomplished, and the box requires less attention than the box now in use.

What I claim as new and desire to secure by Letters Patent is:

1. In a bearing box adapted to receive an axle, a bearing piece or yoke mounted in said box above said axle, bearing rollers having diverging grooves extending longitudinally thereof mounted on said yoke and adapted to engage said axle, an oil well at the bottom of said bearing box, an endless belt extending over and around said bearing rollers and axle, and a partition in said bearing box to maintain the endless belt in its proper position, substantially as and for the purposes set forth.

2. In a bearing box adapted to receive an axle, a bearing piece or yoke mounted in said box above said axle and having an open space between its ends, bearing rollers having diverging grooves extending longitudinally thereof mounted in said yoke and adapted to engage said axle, an oil well in said bearing box, an endless belt extending over and around said bearing rollers and into said oil well, substantially as set forth and for the purposes specified.

3. In a bearing box adapted to receive an axle, a bearing piece or yoke mounted in said box above said axle and having an open space between its ends, bearing rollers mounted in said yoke and adapted to engage said axle, an oil well in said bearing box, a partition between said oil well and said axle, an endless belt extending over and around said bearing rollers and partition into said oil well, substantially as set forth and for the purposes specified.

4. In a bearing box adapted to receive an axle, a bearing piece or yoke mounted in said box above said axle and having an open space between its ends, bearing rollers mounted in said yoke and adapted to engage said axle, an oil well at the bottom of said bearing box, a partition between said oil well and said axle, and rollers mounted upon said partition to engage said belt, substantially as set forth and for the purposes specified.

5. In a bearing box adapted to receive an axle, a bearing piece or yoke mounted in said box above said axle and having an open space between its ends, bearing rollers mounted in said yoke and adapted to engage said axle, an oil well at the bottom of said bearing box, a concave partition having a drain opening therethrough, between said oil well and said axle, and an endless belt adapted to pass over and around said bearing rollers and partition and into said oil well, substantially as set forth and for the purposes specified.

6. In a bearing box adapted to receive an axle, a bearing piece or yoke mounted in said box above said axle and having an open space between its ends, a lug upon the upper side of said yoke and adapted to take into an opening in the top of said box, said yoke being tapered on its top from said lug toward each end, bearing rollers mounted in said yoke and adapted to engage said axle, an oil well in said box, and an endless belt adapted to take over said bearing rollers and pass through said oil well, substantially as set forth and for the purposes specified.

7. In a bearing box adapted to receive an axle, a bearing piece or yoke mounted in said box above said axle and having an open space between its ends, end plates upon said yoke, pins secured to said plate, bearing rollers mounted upon said pins in said open space, an oil well in said box, and an endless belt adapted to pass over said bearing rollers and into said oil well, substantially as set forth and for the purposes specified.

8. In a bearing box adapted to receive an axle, a bearing piece or yoke mounted in said box above said axle, bearing rollers mounted in said yoke and adapted to engage said axle, an oil well in said bearing box, an endless belt adapted to pass over said bearing rollers and into said oil well, and guards upon said yoke adapted to engage the edges of said belt and hold it in proper position relative to said yoke, substantially as and for the purposes set forth.

9. In combination, a car axle box having an oil well, a journal, a self-oiling conveyer consisting of an endless belt mounted on said journal and extending into said oil well, a bearing piece between the top of the car axle box and the axle having a plurality of grooved bearing rollers provided with diverging channels, whereby the oil lifted onto said journal may be uniformly distributed over the entire surface of said axle, substantially as set forth.

10. In a bearing box adapted to receive an axle, a bearing piece or yoke mounted in said box above said axle, bearing rollers mounted in said yoke and adapted to engage said axle, an oil well at the bottom of said bearing box, a partition between said oil well and said axle, and flanged rollers mounted upon said partition to engage and hold said belt in proper position, substantially as set forth and for the purposes specified.

GEORGE E. TENNISON.

Witnesses:
JAMES N. RAMSEY,
FLORENCE HAMMEL.